United States Patent Office 3,494,926
Patented Feb. 10, 1970

3,494,926
1,2 - DISUBSTITUTED - 3 - OXO AND 3 - THIOXO-
2,3,5,6,7,8 - HEXAHYDROIMIDAZO(1,5 - a)PYRI-
DINES AND INTERMEDIATES THEREFOR
Albert J. Frey, Essex Fells, and Robert E. Manning,
Mountain Lakes, N.J., assignors to Sandoz Inc.,
Hanover, N.J.
No Drawing. Filed Oct. 5, 1967, Ser. No. 672,974
Int. Cl. C07d 57/04, 49/34; A61k 27/00
U.S. Cl. 260—293.4                                      4 Claims

ABSTRACT OF THE DISCLOSURE

This disclosure pertains to substituted imidazo pyridines, for example, 1-p-chlorophenyl-2-phenyl-3-thioxo-2,3,5,6,7,8-hexahydroimidazo(1,5-a)-pyridine. These compounds are useful as hypotensives.

This invention relates to novel heterocyclic compounds. More particularly this invention pertains to novel 1-p-chlorophenyl-2-substituted imidazo pyridines. The invention also pertains to methods for preparing these compounds and to intermediates and methods for their preparation.

The imidazo pyridines of the present invention may be represented by the following structural formula:

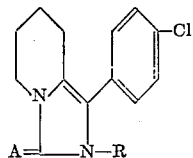

wherein:

R represents phenyl or lower alkyl, i.e. alkyl radicals containing 1 to 5 carbon atoms; and
A represents O or S.

As illustrative of the lower alkyl groups which may be found on the compounds of the present invention, there may be mentioned of methyl, ethyl, isopropyl, and the like.

The compounds designated Formula I above may be prepared by treating a phenyl piperidyl ketone with a lower alkyl or phenyl isocyanate or isothiocyanate, and treating the resulting intermediates with acid. The process for preparing the imidazopyridines of Formula I may be illustrated by the following:

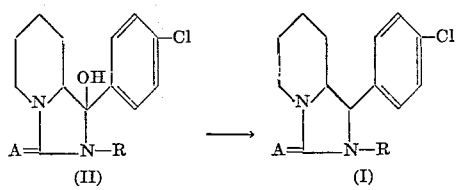

where A and R are as above described.

The pyridines of Formula I are obtained from the 1-hydroxy imidazopyridines of Formula II by treatment with concentrated acid, preferably a mineral acid such as hydrochloric acid, sulfuric acid, phosphoric acid, and the like. This reaction may be carried out at temperatures of about room temperature to reflux temperature, with temperatures of about 30° to about 100° C. being preferred. The product, imidazo pyridines (I), are recovered by conventional techniques such as crystallization, concentration, and the like.

The 1-hydroxy imidazopyridines (II) used as starting materials for the pyridines of this invention (I) are prepared according to the process depicted as follows:

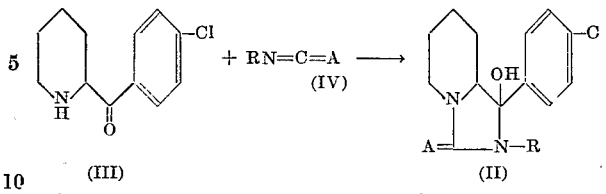

where R and A are as previously defined.

The compounds of Formula II, as indicated above, are prepared by treating a lower alkyl or phenyl isocyanate or isothiocyanate (IV) with the appropriate phenyl piperidyl ketone (III). The isocyanate (IV) is preferably dissolved in a solvent such as tetrahydrofuran, benzene, ether, chloroform, methylene chloride, and the like. The resulting solution is then added to compound (III) in solvent such as tetrahydrofuran, benzene, ether, chloroform, methylene chloride, and the like. The particular solvents used are not critical to the success of the process. The reaction is conveniently carried out at room temperature to reflux temperatures, although preferred temperatures are from about 25° to 60° C. and especially about 25° to 40° C. The product (II) is readily isolated using conventional techniques.

The substituted phenyl piperidyl ketone starting material of the present invention as well as various of the substituted isothiocyanates and isocyanates are known and can be prepared as described in the literature. Such other isothiocyanates and isocyanates not specifically described in the literature can be prepared from available materials in an analogous manner.

The compounds of Formula II may also be illustrated by their tautomeric equivalents such as

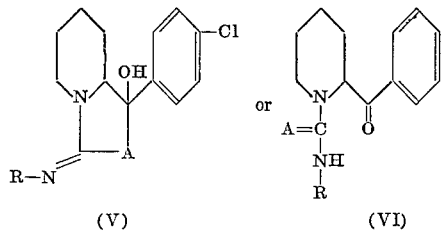

In order to simplify this description, however, Formula II only will be used although it should be understood that either of the tautomeric forms may be represented as well.

The compounds of Formulas I and II are useful because they possess pharmacological activity in animals. In particular, the compounds are useful as hypotensives, as indicated by their activity in rats tested by blood pressure measurement using the caudal artery of an unanesthetized rat's tail, and according to the basic method described by Prioli and Winbury [J.App. Physiol. 15, 323 (1960)]. For such use these imidazo pyridines may be combined with a pharamceutically acceptable carrier or adjuvant. These compounds may be administered orally or parenterally. For this use, the dosage will vary depending upon the mode of administration utilized. However, in general, satisfactory results are obtained when the compounds are administered at a daily dose of from about 10 to 100 milligrams per kilogram of animal body weight. This daily dosage is preferably given in divided doses, e.g. 2–4 times a day or in sustained release from. For most large mammals the total daily dosage is from about 100 milligrams to about 1000 milligrams and dosage forms suitable for internal administration comprise from about 25 milligrams to about 500 milligrams of the compound in admixture with a solid or liquid pharmaceutical carrier or diluent.

A representative formulation suitable for oral administration is a tablet prepared by standard tabletting techniques which contains the following:

| Ingredient: | Parts by weight |
| --- | --- |
| 1-p-chlorophenyl-2-methyl - 3 - oxo-2,3,5,6,7,8-hexahydroimidazo(1,5-a)pyridine | 30 |
| Tragacanth | 2 |
| Lactose | 59.5 |
| Corn starch | 5 |
| Talcum | 3 |
| Magnesium stearate | 0.5 |

The compounds of Formulas I and II are also useful as diuretics and sedatives and for such uses may be administered in the same manner and at the same dosage levels as indicated for the hypotensive utility.

The following examples are provided for the purpose of illustration and not by way of limitation.

Example 1

1-p-chlorophenyl-1-hydroxy-2-phenyl-3-thioxo-1,2,3,5,6,7,8,8a-octahydroimidazo(1,5-a)pyridine.

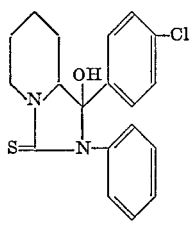

Phenylisothiocyanate (41 g.) is added to a solution of p-chlorophenyl-2-piperidyl ketone (22 g.) in 150 ml. of tetrahydrofuran with stirring. The mixture is stirred for 2 hours and the solution is concentrated in vacuo to about 80 ml. and diluted with 150 ml. of pentane. The resultant crystals (36 g.) are collected by filtration. This solid is recrystallized twice from methanol to give 9.2 g. of 1-p-chlorophenyl-1-hydroxy-2-phenyl-3-thioxo-1,2,3,5,6,7,8,8a-octahydroimidazo(1,5-a)pyridine; m.P. 199° to 201° C.

EXAMPLE 2

1-p-chlorophenyl-1-hydroxy-2-phenyl-3-oxo-1,2,3,5,6,7,8,8a-octahydroimidazo(1,5-a)pyridine.

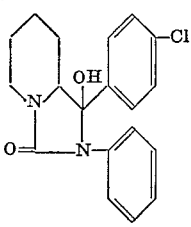

Phenylisocyanate (1.2 g.) in 10 ml. of tetrahydrofuran is added with stirring to a solution of 1-p-chlorophenyl-2-piperidyl ketone (2.2 g.) in 15 ml. tetrahydrofuran. After stirring for 30 minutes, 30 ml. pentane is added and the resultant crystals are collected by filtration to give 2.2 g. of crude 1-p-chlorophenyl-1-hydroxy-2-phenyl-3-oxo - 1,2,3,5,6,7,8,8a - octahydroimidazo(1,5-a)pyridine; m.P. 212° to 215° C. Recrystallization from tetrahydrofuran pentane (1:3) gives 1.8 g. of pure product; m.P. 216° to 218° C.

EXAMPLE 3

1-p-chlorophenyl-1-hydroxy-2-methyl-3-oxo-1,2,3,5,6,7,8,8a-octahydroimidazo(1,5-a)pyridine.

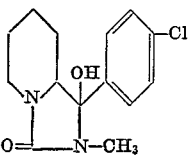

A solution of methyl isocyanate (2.48 g.) in benzene (25 ml.) is added dropwise with stirring to a solution of p-chlorophenyl-2-piperidyl ketone (8.4 g.) in benzene (120 ml.) over a 5 minute period. The reaction mixture is concentrated in vacuo to a syrup which was crystallized from benzene-pentane (1:1) to give 5.5 g. of product; M.P. 140° to 144° C.

EXAMPLE 4

1-p-chlorophenyl-1-hydroxy-2-methyl-3-thioxo-1,2,3,5,6,7,8,8a-octahydroimidazo(1,5-a)pyridine.

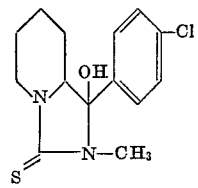

A mixture of p-chlorophenyl-2-piperidyl ketone (2.2 g.), methyl-isothiocyanate (1.6 g.), and benzene (30 ml.) is stirred for 3 hours. The resultant solid is collected by filtration to give 2.5 g. of material which is recrystallized twice from methanol to afford 1.1 g. of 1-p-chlorophenyl-1-hydroxy-2-methyl-3-thioxo - 1,2,3,5,6,7,8,8a - octahydroimidazo(1,5-a)pyridine; M.P. 180° to 182° C.

EXAMPLE 5

1-p-chlorophenyl-2-methyl-3-oxo-2,3,5,6,7,8-hexahydroimidazo(1,5-a)pyridine

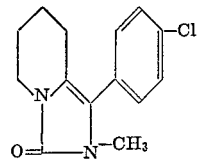

A solution of 1-p-chlorophenyl-1-hydroxy-2-methyl-3-oxo - 2,3,5,6,7,8-hexahydroimidazo(1,5-a)pyridine (5 g.) in methanol (50 ml.) and concentrated hydrochloric acid (2.5 ml.) is refluxed 3 hours. The solution is diluted with 30 ml. water and the resultant crystals are collected by filtration to give 4.1 g. of solid which is crystallized from chloroform-pentane (1:6) to give 3.1 g. of crude material; M.P. 127° to 133° C. Recrystallization from acetonitrile gives 1.33 g. 1-p-chlorophenyl-2-methyl-3-oxo-2,3,5,6,7,8-hexahydroimidazo(1,5-a)pyridine; M.P. 136° to 138° C.

EXAMPLE 6

1-p-chlorophenyl-2-phenyl-3-oxo-2,3,5,6,7,8-hexahydroimidazo(1,5-a)pyridine

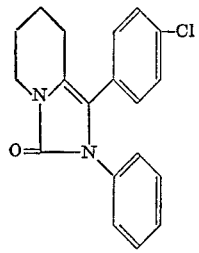

Concentrated hydrochloric acid (0.3 ml.) is added to a solution of 1 - p-chlorophenyl-1-hydroxy-2-phenyl-3-oxo-1,2,3,5,6,7,8,8a-octahydromidazo (1,5-a)pyridine (0.6 g.) in 10 ml. of methanol. The resultant mixture is heated at 70° C. for one hour, cooled, and the crystals collected to give 400 milligrams of 1-p-chlorophenyl-2-phenyl-3-oxo-2,3,5,6,7,8-hexahydroimidazo (1,5-a)pyridine; M.P. 232° to 234° C.

EXAMPLE 7

1-p-chlorophenyl-2-phenyl-3-thioxo-2,3,5,6,7,8-hexahydromimidazo(1,5-a)pyridine

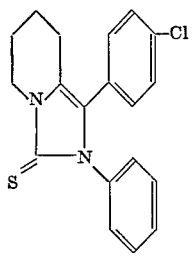

A mixture of 1-p-chlorophenyl-1-hydroxy-2-phenyl-3-thioxo - 1,2,3,5,6,7,8,8a - octahydroimidazo(1,5 - a) pyridine (5 g.) methanol (50 ml.), and concentrated hydrochloric acid (2.5 ml.) is heated at 70° for one hour. After cooling, the solid is collected to give 3.0 g. of the product which is crystallized from methanol to give 2.8 g. of 1-p-chlorophenyl-2-phenyl-3-thioxo-2,3,5,6,7,8-hexahydroimidazo(1,5-a)pyridine; M.P. 256° to 258° C.

What is claimed is:

1. An imidazo pyridine of the formula

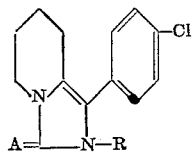

where

A represents O or S; and
R represents lower alkyl or phenyl.

2. A compound according to claim 1 which is 1-p-chlorophenyl - 2 - phenyl - 3-oxo-2,3,5,6,7,8-hexahydroimidazo(1,5-a)pyridine.

3. A compound according to claim 1 which is 1-p-chlorophenyl - 2 - phenyl-3-thioxo-2,3,5,6,7,8-hexahydroimidazo(1,5-a)pyridine.

4. A compound according to claim 1 which is 1-p-chlorophenyl - 2 - methyl-3-oxo-2,3,5,6,7,8-hexahydroimidazo(1,5-a)pyridine.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |

OTHER REFERENCES

Chemical Abstracts, vol. 60, p. 6840h, Stanovnick et al., March 1964.

Organic Chemistry, Fieser et al., 3rd ed., 1956, pp. 56–57.

Burger: Medicinal Chemistry, vol. 1, 1951, pp. 38, 39, 44, 45 and 48.

HENRY R. JILES, Primary Examiner

S. D. WINTERS, Assistant Examiner

U.S. Cl. X.R.

260—294, 294.7; 424—267